F. W. ROLLER.
MEASURING INSTRUMENT.
APPLICATION FILED JULY 30, 1917.
1,435,259.
Patented Nov. 14, 1922.
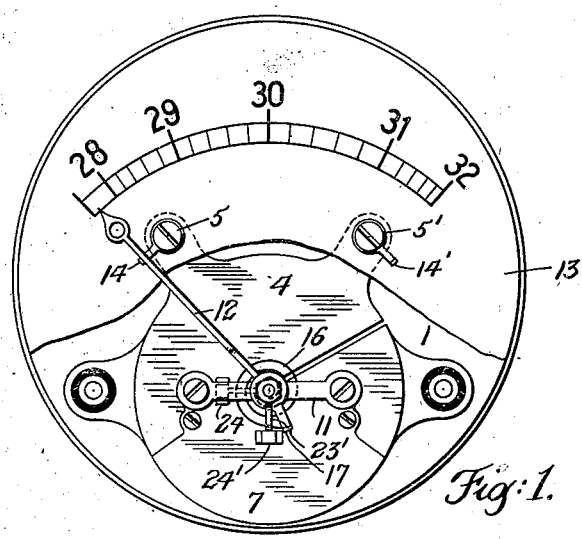
Fig: 1.
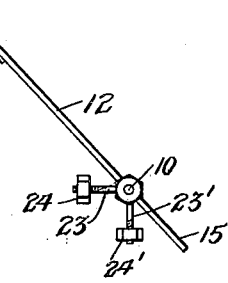
Fig: 3.
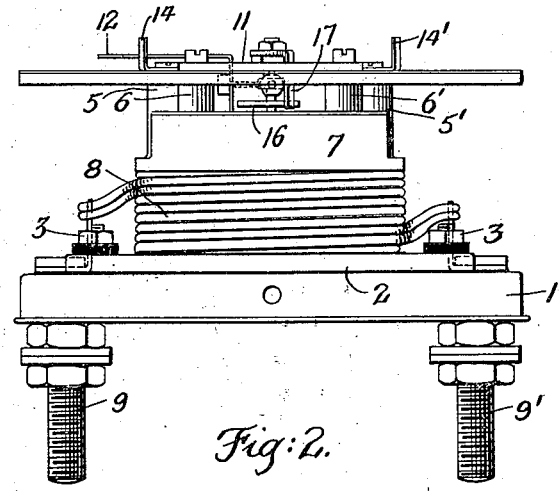
Fig: 2.
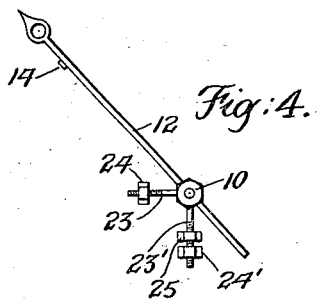
Fig: 4.
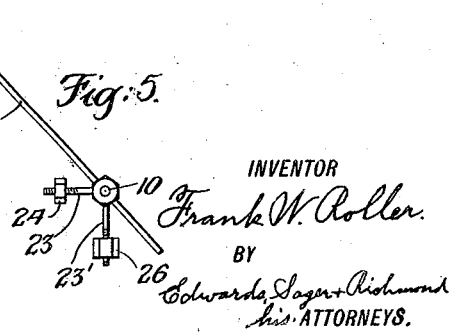
Fig: 5.
INVENTOR
Frank W. Roller.
BY
Edwards, Sager & Richmond
his ATTORNEYS.

Patented Nov. 14, 1922.

1,435,259

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

MEASURING INSTRUMENT.

Application filed July 30, 1917. Serial No. 183,432.

*To all whom it may concern:*

Be it known that I, FRANK W. ROLLER, a citizen of the United States, residing at East Orange, in the county of Essex and State of New Jersey, have invented certain new and useful Improvements in Measuring Instruments, of which the following is a specification.

In a measuring instrument in which the value of the quantity to be measured is indicated by the position of a needle relative to its scale, the length of the said scale is limited by the physical dimensions of the containing case and the angular deflection which the mechanism actuating the needle is capable of causing. In conventional electrical measuring instruments, for example, enclosed in circular cases, the case diameter must be held restricted because of considerations of space occupied, and the angular deflection which the instrument mechanism is capable of giving with good results is approximately 90°. In such instruments the needle in its at rest position indicates zero value of current flow, and all values between zero and the maximum are included between the scale extremities. In many cases the larger proportion of these values are without interest, it being more desirable to be able to ascertain with enhanced readiness some particular normal value and the deviations to a short extent on either side thereof. In other words, if the indications below some minimum value less than normal and above some maximum value greater than normal are suppressed and the instrument arranged so that the needle will make its full angular excursion between these minimum and maximum points, the instrument is much more desirable for many applications.

For example, in an electrical measuring instrument to indicate amperes which may be built into a circular enclosing casing, and which by reason of type of mechanism employed has a scale deflection of 90°, it may be desired to read a normal current value of 30 amperes with accuracy, to be able to observe with accuracy currents of a value of 2 amperes above and below the normal, all other current values being without interest for the purpose in hand. With a conventional instrument the useful range of 28 to 32 amperes would occupy but a small portion of one extremity of the 90° scale, the remainder of the scale indicating the values which are not of interest.

It has been proposed to meet the desideratum that the zero indication and the indications between zero and desired minimum be suppressed, by imposing upon the movable element of the instrument an initial torque holding the needle against the stop at the initial point of its path, the torque having such value as to be overcome only when the current through the instrument attains the minimum value which is to be indicated. For example, if volute springs are employed as the instrument counter torque means, which springs in a normal instrument in which all values from zero to maximum are indicated, exert no counter torque with the instrument needle at the zero position, it has been proposed to afford an initial torque by giving initial tension to the springs, such that the current strength must attain the stipulated minimum value before the said initial torque is counter balanced. This expedient is, however, practical only under special conditions as where the percentage of scale values to be suppressed is relatively small, the objections encountered being illustrated by the following example:—

In an instrument having a needle actuating mechanism suitable for causing needle deflections of a maximum of 90°, and a normal capability of indicating all current values between zero and 100 units of current, and such characteristic that equal current increments give equal increments of actuating torque, and counter torque means giving equal increments of counter torque with equal angular increment of deflection, assume the actuating torque of the instrument with 100 units of current flowing, and the counter torque afforded by the counter torque means with the needle at rest at its extreme excursion of 90° from its zero point, to be 10 milli-meter grams. Assume that the user is interested only in the last 20% of the range of current involved, that is to say, in the units of current value from 80 to 100, and that it is desired to expand the angular deflection of one-fifth of 90° which it normally occupies to the full 90°. If the counter torque means which is embodied is a volute spring (or a plurality of such) the same must accordingly be wound up (or unwound) from initial no-torque stage to afford four-fifths of full torque, that is to say, to press the indicating needle back against a stop appropriately located at the zero position of the needle with a counter torque of 8 milli-meter grams. If now 80 units of current are passed through the instrument this initial counter torque will be exactly balanced. A further addition of 20 units of current will, however, cause the needle to deflect but one-fifth of 90°, that is to say, the procedure of winding up the normal springs of the normal instrument has merely transferred the portion of the scale range which it is desired to observe without expanding that range. If it be attempted to overcome the difficulty by substituting for the normal volute springs ones having one-fifth of normal torque so that after the current has attained the minimum value of 80 units the further addition of 20 units will meet with but one-fifth of the former increase of torque with increase of deflection, then the desired excursion of 90° for a current range of 80 to 100 units is theoretically obtained. The springs, however, in such a case present difficulty in that while an initial counter torque of 8 milli-meter grams can be afforded by the normal spring cited in this example when the same is wound up four-fifths of 90°, the special spring of one-fifth normal torque will have to be wound up to five times that angular amount, that is to say, to 360°, after which a still further winding of 90° will ensue in the excursion of the instrument needle from its stop to the 100 unit value scale division. These springs being suitable for service equivalent to but 90° stressing, this great overstressing introduces serious mechanical difficulties and impairs the accuracy of the readings, making this method impractical for the uses here intended.

The general objects of my invention are to produce an instrument capable of fulfilling the requirement of a large measure of scale suppression without sacrifice of accuracy, and of simple and durable design, and economy in the amount of material and labor required, and obtain full scale readings for the values in which the user is interested. Other objects and advantages of my invention will be understood from the following description and accompanying drawings which illustrate preferred forms of construction.

Fig. 1 is a front elevation of one form of instrument embodying my invention with the cover removed and the scale plate partly broken away. Fig. 2 is a bottom view of the same with the cover removed. Fig. 3 is a detail view of a portion of the movable element, and Figs. 4 and 5 are similar views of modifications.

In many measuring instruments, the torque normally opposing the deflection of the movable element is caused by a spring; in other cases by magnetic, or electromagnetic, or static means, in others by a weight, or the force of gravity, and so forth. In accordance with my invention, I combine with the means which normally opposes the deflection of the movable element, an auxiliary or supplementary means, which adds an initial torque opposing the movable element which in my preferred form is sufficient to retain the indicating needle in fixed or approximately fixed position, until the quantity to be measured exerts a torque upon the movable element which balances or approximately balances the opposing torque imposed by the auxiliary means, although in some cases the usual means which opposes the deflection of the movable element may be utilized to increase or decrease to some extent the torque of the auxiliary means before the quantity to be measured exerts sufficient torque to deflect the movable element from its initial position; but no appreciable modification of the usual means opposing the deflection of the movable element is necessary.

As one form of measuring instrument in which my invention may be embodided, I have illustrated in the accompanying drawings an ammeter measuring the electric current passing in a circuit, the ammeter illustrated being of the electromagnetic type well adapted for the measurement of alternating current. In the drawings 1 indicates a base plate which in this instance is of sheet metal. Fixed thereto and insulated therefrom is a frame of nonmagnetic material such as brass or aluminum and comprising a bottom plate 2, which is bolted or otherwise secured to the base as shown at 3. The frame also has an outer portion consisting of an approximately circular plate 4 having studs 5, 5' and 6, 6' outwardly extending therefrom. The plate 4 is provided at its lower portion with an air chamber 7, which in this instance is used as a damping means for the movable element. The plates 2 and 4 of the frame are connected by an integral central hollow core, around which is wound the coil 8, which carries the current to be measured. Electrical connections from the ends of this coil are made to studs 9, 9', which form the terminals of the instrument, these being suitably insulated from the base 1. The movable system is suitably supported within the central core as by having its shaft 10 supported in a bearing at the inner end of the frame by a suitable bridging piece and the outer end supported by a bearing in the bridge 11 supported by the studs 6, 6'. In this particular instrument, the frame supports a strip of magnetic material within the coil 8, near the movable element as by the above mentioned central hollow core, which reacts upon another strip or segment of magnetic material carried by the movable element within the above mentioned central core to deflect the movable system in accordance with the amount of current through coil 8, but as these details form no part of this invention, and as various forms and types of instruments may be used, it is unnecessary to further illustrate or describe the means for causing the deflection of the movable element.

Mounted upon the shaft 10 of the movable element is an indicating needle or pointer 12, which has an outwardly extending portion so as to bring the needle over the face of the scale plate 13, the latter being supported on the studs 5, 5'. These studs also carry at their outer ends outwardly extending stops 14, 14', which limit the movement of the needle 12 and movable element at their extreme positions. The shaft 10 also supports a vane which extends within the air chamber 7 for the purpose of acting as an air damper for the movable system. One end of the usual volute spring 16 is secured to the shaft 10, the other end of which is secured to an adjustable strip 17 supported on the bridging piece 11. This spring 16 preferably exerts no appreciable torque upon the movable system when the indicating needle is in the initial position shown, but when the latter is deflected from said position, the spring exerts the usual opposing torque for all deflected positions of the movable system. Consequently, the spring is called upon to render service only during the normal range of deflection on the movable system and thus no abnormal amount of service is imposed upon the spring, thus avoiding undue strains or stresses in said spring which might interfere with the accuracy of indication of the instrument. In the present instance, it is assumed that the normal value of the current to be measured is say, 30 amperes and that it is sufficient for the purposes of the use to which the instrument is to be applied to secure an indication of a range from 28 to 32 amperes and that the highest degree of accuracy is required near the 30 ampere indication making it desirable to have a large range of movement of the indicating element for comparatively small variations from the 30 ampere value. The scale is therefore indicated in Fig. 1 as having markings from the initial position of 28 amperes to the maximum position of 32 amperes with subdivisions of the scale between these values correspondingly indicated.

If an auxiliary torque opposing means be combined with the above described instrument exerting a torque at the initial position equal to the torque which the passage of 28 amperes through the coil 8 will create, then the indicating needle will be stationary in its initial position until the value of the current attains 28 amperes. If the opposing torque of the auxiliary means remains substantially constant throughout all the positions to which the movable system may be moved, then the increased opposing torque when the movable system is deflected will be that exerted by the normal torque opposing means such as the spring 16 permitting a full scale deflection of say 90° when the 32 amperes pass through the instrument and the instrument may be calibrated and the scale marked in the usual manner.

In the form of my invention illustrated in Figs. 1, 2 and 3, a threaded arm 23 is rigidly secured to the shaft 10 which arm carries an adjustable weight in the form of a nut 24. With the instrument in a vertical position and the indicating needle against the stop 14, the weight of the arm 23 and nut 24 imposes a supplemental opposing torque upon the movable system. When the horizontal arm 23 is moved away from this position however, by deflection of the movable system, it causes the opposing torque exerted by the arm 23 and weight 24 to rapidly decrease which would give an undesirable spacing of the scale divisions. I therefore secure to the shaft 10, in the form shown in Figs. 1, 2 and 3, an additional auxiliary threaded arm 23' carrying an adjustable weight in the form of a nut 24', which arm is shown at right angles to the arm 23 and in a vertical position when the needle 12 is against the stop 14. When sufficient current flows through the ammeter to cause deflection of the system, the opposing torque caused by the arm 23 and weight 24 decreases as above stated, but the opposing torque due to the arm 23' and 24' increases over a deflection of 90°. The result is to obtain a comparatively uniform opposing torque throughout the range of deflection of the instrument by the combined effect of the arms 23, 23' and weights 24, 24', the variations in the opposing torque due to this auxiliary means being more uniform near the 45° position and more variable near the initial and maximum deflected positions of the movable element. This results when used in conjunction with the usual spring 16 in giving a form of scale spacing derived from calibrating the instrument as shown in Fig. 1, giving more accuracy and a more easily read scale at or near 30 amperes than at or near 28 or 32 amperes in this particular illustration.

It is evident that the opposing torque due to the arms and weights may be modified or varied in any way desired by relative adjustment of the weights 24, 24' along their supporting arms, or by modifying the angle between the arms 23, 23', or by changing the mass of the weights 24, 24', or their relative mass, also instead of having the arms positioned horizontally and vertically in the initial position as in the form shown, they may be shifted to different angular positions on the shaft so that in the initial position both arms may be displaced from the position shown in Fig. 3 by any desired angle, also additional arms and weights may be utilized, the various modifications depending upon the type and character of the instrument and the character of the scale readings desired.

Fig. 4 illustrates an embodiment of my invention in a form of instrument having the normal torque opposing means due to gravity instead of being due to the spring 16 of preceding examples. Here the usual torque opposing means is indicated as the weight 25 on an arm 23' fixed to the shaft 10, giving an instrument of the gravity pendulum type. In practising my invention there is combined therewith in this example the weights 24' and 24, the former on the arm 23' and the latter on the arm 23 at right angles thereto in this example. In Fig. 5 the construction is similar, except the weights 24' and 25 of Fig. 4 are shown combined in the single equivalent weight 26. In these examples, the various controlling factors may of course be modified as referred to in the preceding paragraph to suit the requirements of any particular case.

It will be understood that my invention may be applied to instruments of various types and forms of construction and exemplified in various other embodiments without departing from the scope thereof.

I claim:—

1. In a measuring instrument, a movable element, means for causing the deflection of said element from its initial position, means opposing the deflection of said movable element when deflected from its initial position, and auxiliary means for exerting a torque opposing the deflection of said element at its initial position, said auxiliary means comprising a plurality of weights connected with said movable element, said weights being angularly displaced from each other with reference to the axis of said movable element.

2. In a measuring instrument, a movable element, means for causing the deflection of said element from its initial position, means opposing the deflection of said movable element when deflected from its initial position, and auxiliary means for exerting a torque opposing the deflection of said element at its initial position, said auxiliary means comprising a plurality of weights connected with said movable element, said weights being angularly displaced at right angles to each other with reference to the axis of said movable element.

FRANK W. ROLLER.